April 10, 1962   H. A. KLUMB   3,029,036
STRIP CHART TRANSPORT MECHANISM
Filed June 24, 1960   3 Sheets-Sheet 1

INVENTOR.
Harvey A. Klumb
BY

INVENTOR.
Harvey A. Klumb

April 10, 1962 H. A. KLUMB 3,029,036
STRIP CHART TRANSPORT MECHANISM
Filed June 24, 1960 3 Sheets-Sheet 3
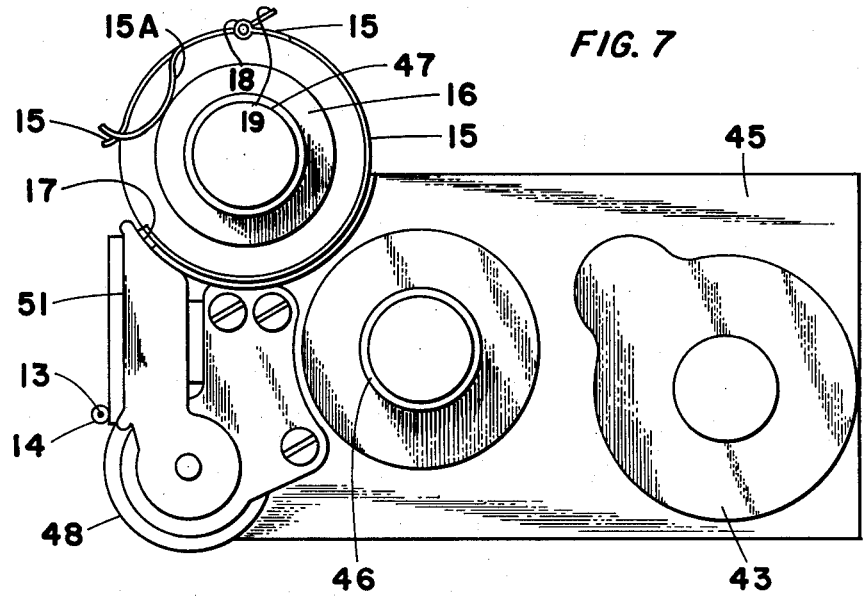
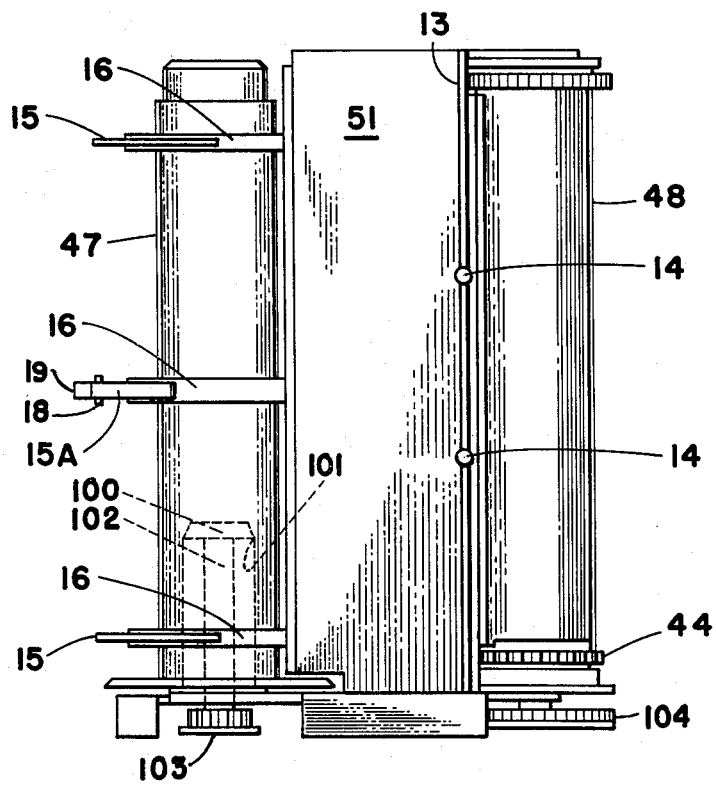
INVENTOR.
Harvey A. Klumb
BY P. J. Young, Jr.

United States Patent Office 3,029,036
Patented Apr. 10, 1962

3,029,036
STRIP CHART TRANSPORT MECHANISM
Harvey A. Klumb, Pittsford, N.Y., assignor to Taylor Instrument Companies, Rochester, N.Y., a corporation of New York
Filed June 24, 1960, Ser. No. 38,536
5 Claims. (Cl. 242—67.2)

This invention relates to strip chart transport mechanisms of the type wherein a recording element in the form of a more or less endless strip of paper is driven past a marking element, such as a recorder stylus, to a storage element, such as a rewind drum, which accumulates marked recording element.

The main object of this invention is to provide a strip chart transport mechanism of the type described wherein it is possible to tear or cut off lengths of said marked recording element without interfering with recording on subsequent lengths of chart and wherein after marked chart is removed, the chart remaining will be taken up by the said storage element automatically as said chart remaining is recorded upon.

The feature of automatic rewind of strip chart finds its main use in recording operations wherein it is necessary to remove marked strip chart from the rewind drum relatively frequently in order to study the information marked on said chart from time to time, as in the recording of process variables occurring industrially, such as temperature, flow and so on. Removal of such marked chart may occur many times during the life of one rolled-up integral length of strip chart, hence each time marked chart is removed, an advancing end of chart is created that must somehow be conducted to and acted upon by some storage means, such as a chart rewind drum upon which marked chart is intended to be accumulated until torn from said integral length of strip chart.

According to the invention, a chart rewind drum is provided with means for receiving and cinching an advancing end of strip chart upon said drum without it being necessary to secure said advancing end to the said rewind drum by a manual operation performed by human hands.

Figure 1:
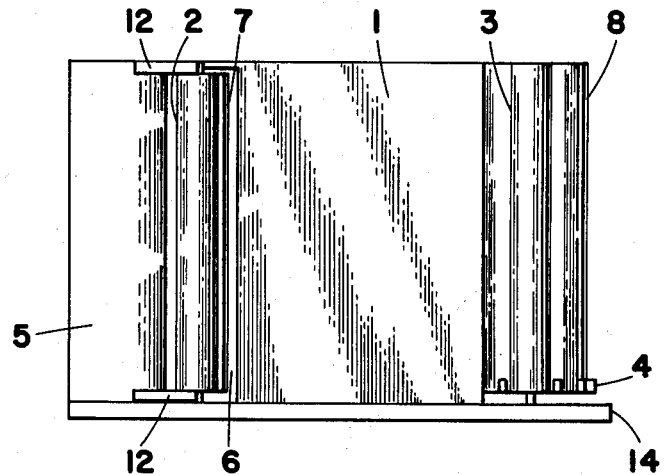

In the drawings, FIGURE 1 is a front elevation of a record chart transport according to the invention;

FIGURES 2 to 6, inclusive, are views taken looking down on the instrument of FIGURE 1 and illustrate the operation of the invention;

FIGURES 7 and 8 are respectively a plan view and a front elevation of another form of my invention.

Save as noted hereinafter, the strip chart mechanism according to the present invention may be identical in principle to that described in the copending application for U.S. Letters Patent of Harvey A. Klumb and George E. Heller, S.N. 749,988, filed July 21, 1958, entitled "Exhibiting or Control Means," and assigned to the assignee of the present application.

Figure 2:
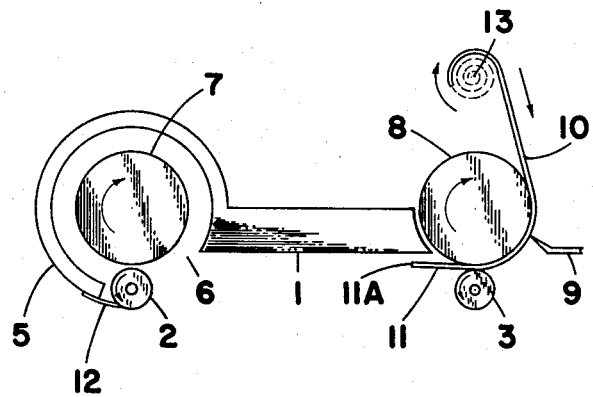

In FIGURE 1, reference numeral 1 denotes a platen and reference numerals 7 and 8, respectively, represent a rewind drum and a drive drum, the latter having a set of teeth 4 (FIGS. 1 and 6) thereon for pulling strip chart from a roll of unused chart (shown schematically at 13 in FIGURE 2). The enumerated parts, in the order named, correspond to the parts denoted in the drawings of the aforesaid copending application by the reference numerals 51, 47, 48 and 44. If the teachings of the aforesaid copending application be followed, the said roll of unused chart would be mounted on a supply drum (not shown) like that denoted by reference numeral 46 in the drawings of the said copending application.

In accordance with the present invention, there are also provided a cylindrical retaining roller 3, a cylindrical hold-down roller 2 and a chart-end guide 5, said guide 5 being shown as a more or less cylindrical container or housing having a slot 6 therein. The said slot 6 is provided for the purpose of permitting access of strip chart to the rewind drum 7, drum 7 being mounted in the guide 5 more or less coaxially thereof and parallel to the length of slot 6 and hold-down roller 2. The lengths of drive drum 8 and retaining roller 3, and the surface of platen 1 in view in FIGURE 1 run more or less parallel to the axis of rewind drum 7, whereby strip chart as it comes from rewind drum 7 will have its length horizontal and width vertical, with its surface more or less parallel to the surface of platen 1. Roller 2, at least, should be mounted so as to rotate freely on its axis, and in what follows both rollers will be treated as rotatable. Rollers 2 and 3, then, may be considered to be mounted for free rotation, whereby drum rotation is effective on one or both rollers, either through contact of chart and rollers, in the case of both rollers, or direct contact of roller 2 with drum 7 when no chart is passing between roller 2 and drum 7.

The parts described thus far may be considered to be fixed or pivoted, as the case may be, to a base 14.

Figure 6:
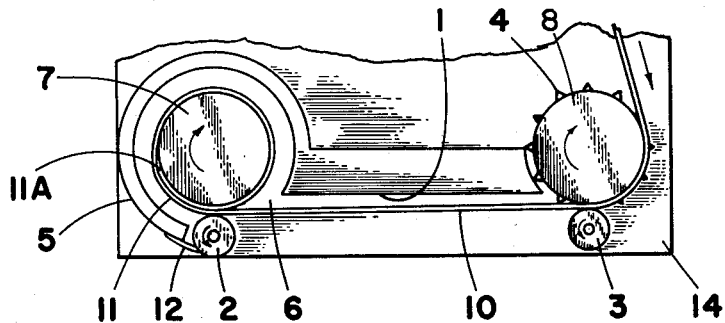

FIGURE 6 illustrates the normal operation of the chart transport mechanism, i.e., chart 10 is being pulled by drum 8 from roll 13 of chart (not shown in FIGURE 6) in the direction shown by arrow.

The advancing end 11, that is, the free or outer or leading end of a fresh roll 13, or of the remainder of roll 13 after the marked portion thereof has been severed, of the chart 10 is shown in FIGURE 6 as clinched between the surface of drive drum 7 and a following portion of chart 10 that is somewhat more than 360 degrees distant from the leading edge. The said advancing end 11 naturally begins with a leading edge, denoted here by the reference character 11A. As is usual, chart 10 is engaged with drive drum 8 by means of perforations (not shown) at the lower chart margin interfitting with teeth 4 of drive drum 8, but unlike conventional chart drives, only the friction generated between the surface of rewind drum 7 and the leading portion 11 of chart 10 secures chart 10 to rewind drum 7. As chart builds up on rewind drum 7, the effective radius of the drum increases, the effect of which is compensated for by driving rewind drum 7 through a slip-coupling or clutch, such as that disclosed and claimed in the aforesaid pending application of Klumb and Heller. There will be described hereinafter, in connection with FIGURES 7 and 8, the rudiments of the rewind-drum-radius-compensating, slip-coupling drive of Klumb and Heller, such as might be used in the chart transport mechanism, FIGURE 1 hereof. In addition, it is necessary to pivot hold-down roller 2 on a pair of leaf springs 12, or the like so that as chart 10 builds up on the rewind drum 7, the hold-down roller 2 is deflected outwardly of slot 6 and presses on the rewinding chart. (In FIGS. 2 to 6 inclusive, the top leaf spring 12 has been omitted for clarity.)

In conventional strip chart transport mechanisms, end 11 of the chart must be secured to drum 7 by a manual operation involving some fastening means. With my invention, once the chart is engaged with teeth 4 on the drive drum 8 and the advancing end of the chart is threaded between retaining roller 3 and drive drum 8, and a record stylus 9 is positioned in marking relation to the chart, as shown in FIGURE 2, the transport mechanism may be left to itself, insofar as is concerned marking chart and rewinding it on drum 7, as will be seen from the following description of the events occurring when the mechanism is operating and in the configuration shown in FIGURE 2.

Figure 3:
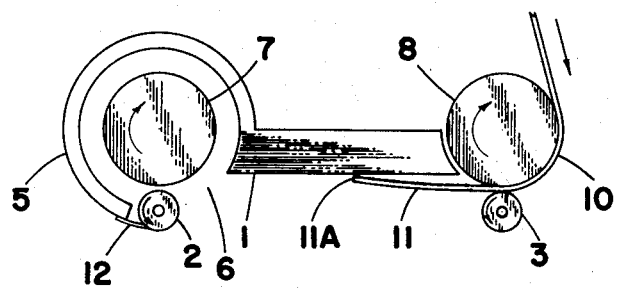

As indicated by the showing in FIG. 2 of chart roll 13, said roll is positioned so that the natural radius of curvature or curl of chart 10, due to chart being in a rolled-up condition initially, is in the same sense as the curvature of the surface of drums 7 and 8. Therefore, as illustrated in FIG. 3, the leading edge of chart end 11 tends to maintain contact with the surface of platen 1 and as a result the end 11 is necessarily guided in the direction of slot 6 as chart leaves drive drum 8. At the same time, retaining roller 3 prevents any tendency of chart to move away from the surface of drive drum 8 in the chart path from where chart 10 first engages drum 8 to retaining roller 3. Hence, solid driving engagement of chart perforations with the teeth 4 and solid marking contact of chart surface with stylus 9 are assured.

Figure 4:
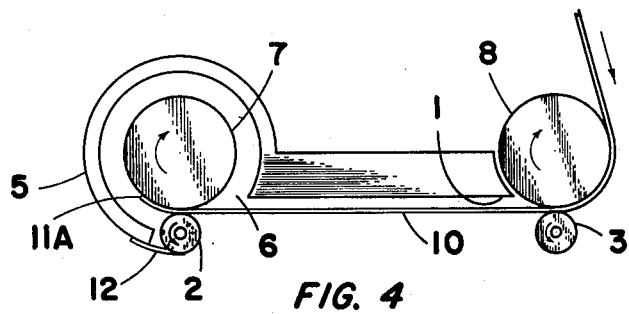

Soon, chart end 11 is caught between hold-down roller 2 and the surface of rewind drum 7, as shown in FIGURE 4. Roller 2, of which the leaf spring mountings 12 lightly thrust it against drum 7, and drum 7, of which at least portions of its surface should be constructed to have a greater frictional drag against the strip chart than the strip chart has relative to itself, will therefore, exert a sort of wringing and guiding action on the chart which results in the leading end 11 being forced against the interior surface of guide 5, whereby the curvature of said surface constrains the leading edge 11A of end 11 to move in the direction of said curvature, the beginning of such motion being shown in FIGURE 4. Naturally, the interior surface of guide 5 should be sufficiently smooth and uniform not to catch the leading edge of advancing end 11 of chart 10.

Figure 5:
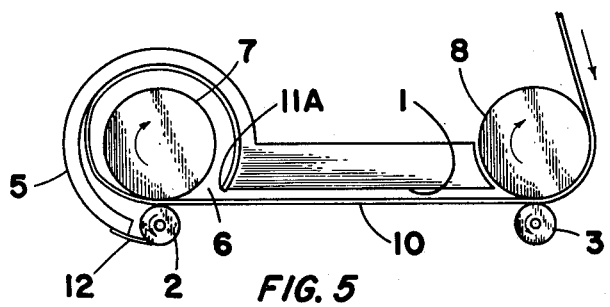

After the leading edge of end 11 has proceeded completely around the inner surface of guide 5, it is constrained as indicated in FIG. 5 by a following portion of chart passing through slot 6 to cause said end 11 to move into the converging space between said following portion of chart and the surface of rewind drum 7 under the hold-down roller whereby soon the leading end 11 is wedged between said following portion and said drum 7. At this point, the frictional drag of the drum surface couples leading end 11 firmly to said drum surface and eventually cinches all the chart drum 7 into a tight roll, the cinched first coil of which roll is evident in FIGURE 6.

The cinching into a tight roll may come about as a result of providing a slip-coupling (not shown) between rewind drum 7 and some motor means (not shown). For example, as disclosed in the aforesaid copending application of Klumb and Heller, the drive of the transport mechanism may be arranged so that at all times the rewind drum 7 would take chart from the drive drum 8 faster than the latter can move the chart, but for the said slip-coupling. Therefore, when chart end 11 wedges between the surface of rewind drum 7 and a following portion of chart 10 under hold-down roller 2, the drag of rewind drum surface on paper is greater than paper on paper, and hence the end 11 of the chart is pulled around rewind drum 7 faster than it is coming off drive drum 8 until chart slack is taken up and tension in the chart between drums 7 and 8 causes the slip-coupling to slip, thereby equalizing the rate at which chart is being rewound and the rate at which drive drum 8 is moving toward the rewind drum 7. The amount of slack to be taken up is approximately the distance end 11 moves in its first excursion around the axis of the rewind drum 7 less the circumference of said rewind drum.

The necessary orientation of the novel chart transport mechanism with respect to gravity depends on the ability of the paper to maintain its natural radius of curvature to such extent that its leading end 11 can be moved to and between hold-down roller 2 and drum 7 by the driving efforts of drive drum 8. With vertical mounting, i.e., as indicated in the description of FIGURE 1, even the thinnest chart papers are free from buckling or sagging.

As will be obvious from the foregoing, used sections of chart can be removed as pleased merely by severing the chart to the left of roller 3 and pulling the rewinding portion of the chart completely off the rewind drum (the aforementioned slip-clutch permits chart to be thus unwound from the rewind drum while the chart transport mechanism is in operation). A new advancing chart end 11 remains, however, which will go through the sequence of events pictured in FIGURES 2–6 without human intervention. While any conventional means of severing the chart may be used, it is preferable to use a severing means that leaves a smooth, straight leading edge 11A that presents no impediment to being fed through slot 6, between guide 5 and drum 7, and/or between a following portion of chart and drum 7. Such a severing means is disclosed in the copending application of Domenic Battaglini, Richard G. Beach and Harvey A. Klumb, entitled Chart Severing Means for Strip Chart Transport Mechanism, assigned to the assignee of the present application, Serial No. 38,495 and filed June 24, 1960.

The function of roller 3 is to prevent the advancing end 11 of strip chart from lifting off drive drum 8 before rewinding of chart starts, whereas the function of roller 2 is to load the contact between the said advancing end 11 and the surface of drum 7 whereby the requisite drag will be created between drum 7 and the said end 11.

In addition, the roller 3 and platen 1 together constrain the leading edge of chart end 11 to a path that causes the said end 11 to enter slot 6 between the left vertical edge of platen 1 and the roller 2. At this point, guide 5 takes care of wrapping end 11 around drum 7, until finally a following portion passing through slot 6 deflects the leading edge 11A of said end 11 into the converging space between roller 2 and drum 7 after said leading edge leaves the clockwise extremity of guide 5.

It will be noted that the curl of the paper at all times aids the action just described and, in a sense, it might be said that guide 5 confirms the tendency of the chart to wrap around drum 7. However, the natural radius of a given segment of a roll of strip chart varies as its moisture content (which is mainly determined by the atmosphere around the chart), the tightness with which it was originally wound into the roll 13, its former radial location on roll 13, and so on, and is generally larger than the radius of drum 7. While under average atmosphere conditions the natural curl of the chart will permit automatic rewind of chart with a guide 5 of substantially less angular extent than indicated in FIGURES 2 to 6, inclusive, it is preferable to use a guide 5 of about the maximum angular extent (i.e., that shown in the drawings, for example) in order to insure automatic rewind even under extreme conditions of humidity, etc. Note that a chart end 11 of zero radius of curvature could be warped against, or be caused to move parallel to the surface of platen 1 simply by moving the roller 3 a little clockwise of the position shown in the drawing, whereby automatic rewind would be assured.

The relative proportions of FIGURES 1 to 6, inclusive, substantially quantitatively indicate one arrangement of drums, platen and guide by means of which arrangement automatic rewind can be attained. However, such proportions can be varied considerably and it is believed that foregoing discussion will fully inform those skilled in the art as to permissible alteration in the aforesaid relative proportions. Therefore, the quantitative aspect of FIGURES 1 to 6, inclusive (or, for that matter, of FIGURES 7 and 8), is merely exemplary and is not intended as a limitation on the protection claimed, infra, for my invention. In this connection, it must also be noted that chart thickness has been greatly exaggerated in FIGURES 2 to 6, and that roller 2 is shown slightly spaced from the surface of drum 7 in FIGURES 2 and 3, although the chart end 11 has not yet passed between drum and roller. In practice, the chart will be quite thin (0.002 inch, for example) and as a practical matter, it is necessary that roller 2 touch or at least be so close to the surface of drum 7 that when a free end 11 of thin chart comes along, roller 2 and drum 7 "wring" the said free end, i.e., the free end becomes pressed against the surface of drum 7 with sufficient force by roller 3, that the surface of free end 11 drags on the surface of drum 7.

As has been remarked supra, the inventive principles illustrated in FIGURES 1 to 6, inclusive, may be realized in the strip chart transport mechanism disclosed in the aforesaid copending application of Klumb and Heller. FIGURES 7 and 8 illustrate a form of the present invention which, save as indicated herein below, is identical to the strip chart transport mechanism disclosed in FIGURES 5 and 7 of the aforesaid copending application, and claimed therein. As in said copending application, in the present application, reference numerals 51, 48, 44, 47, 46, 43 and 45 denote respectively a platen, a drive drum, chart-perforation-engaging teeth on said drive drum, a rewind drum, a supply drum, a motor for driving said drums, and a base plate upon which the enumerated elements are mounted. Reference should be had to FIGURES 6 and 8 of the said copending application for such details as a sprocket and belt drive for said drums and a slip clutch through which said drive transfers rotary motion to rewind drum 47.

According to the present invention, a rod 13 running parallel to platen 51 and the axis of chart drive drum 48 is provided spaced from the surface of said platen, said rod having several more or less spherical elements 14 spaced therealong, rod to platen spacing being large enough to permit the leading end of a roll of chart (not shown), mounted on supply drum 46, to be inserted between the platen and spherical elements 14. Said spherical elements may be fixed in position, but should be smooth next to the strip chart so as to hold the leading end of chart against or nearly against the platen with a minimum of friction. Platen 51, of course, should be smooth and even for the same reason. Rod 13 itself may be round or square in cross-section and should be attached at its ends by any convenient means (not shown) to the platen structure or other stationary elements of the record chart mechanism adjacent the ends of said rod.

In order to guide the leading end of a roll of strip chart around rewind drum 47, two curved guides 15 are provided which may be fastened as at 17 to stationary structure such as that including platen 51. The inside surfaces of guides 15 should be smooth so as not to impede a leading end of strip chart in its progress around the rewind drum 47.

In order to generate chart-drum friction, three annuli 16 are provided on drum 47 having outer surfaces which frictionally engage the surface of an advancing end of strip chart as it passes around the drum 47. Most of the chart drag is intended to be generated between the center annulus and strip chart, the other annuli mainly serving to assure that chart is rewound with the wound edges of the chart parallel to the edges of chart advancing toward the rewind drum.

To produce the requisite drag between chart and the center annulus, a hold-down guide 15A is provided between the two guides 15, said hold-down guide being pivotally mounted as at 18 on a third guide 15 (not visible from the views of FIGURES 7 and 8) which has been curtailed in length, as is evident from FIGURE 7, to provide for mounting hold-down guide 15A on pivot 18 at the end thereof. Guide 15A is provided with a tail piece 19 and is loaded by a spring (not shown) to press against the center annulus 16, said tail piece being utilized to lift guide 15A off rewound chart, if desired, when the latter is being removed from drum 47. Thus, hold-down guide 15A and the curtailed center guide 15, on which the former is mounted, guide the center portion of said advancing chart end 11 around rewind drum 47 and, in addition, hold-down guide 15A presses the advancing end 11 of a strip chart, coming from supply drum 46 via drum 48, against the center annulus 16, to cause rewind drum 47 to drag said end 11 around said rewind drum.

As is obvious from what has been disclosed thus far, a leading end 11 of chart from under spherical elements 14 will be guided around rewind drum 47 until a portion of chart contacts the rewind drum 47 and the drag of chart on drum causes the leading end of the paper to advance around the drive drum faster than drive drum 48 is feeding it toward rewind drum 47, and eventually results in a tightly-cinched roll of paper building up on the rewind drum.

To insure high paper-drum drag, annuli 16 may be made of soft rubber with a "grabby" flat peripheral surface, so that drag of the annuli on the chart is higher than the total drag exerted on the chart by hold-down guide 15A, and by paper on paper (after the leading edge of end 11 is pulled between the annuli and a following portion of strip chart). Obviously, materials other than soft rubber can be provided in the shape of annuli with peripheral surfaces of sufficiently non-slip nature as to drag chart end 11 around, and clinch it to drum 47.

The said annuli 16 may be considerably varied in form and proportions. As shown, annuli 16 have flat peripheries and extend well into the space between guides 15 and the general surface of drum 47. The flat external surfaces of the annuli 16 assure a large amount of drag being generated upon contact of chart and annuli. However O-rings, i.e., annuli of circular cross-section having a periphery and of such dimensions as to project but slightly above the general surface of drum 47, could also be used. In fact, a rubber sleeve entirely covering drum 47 might be used, or drum 47 might be treated by abrading, coating, or the like, to have a surface sufficiently non-slip to generate the requisite chart-drum drag.

It will be observed that the extent to which guides 15 extend around the rewind drum 47 is not very critical. Looking at FIGURE 7, it will be seen that spherical elements 14 and the fore-surface of platen 51 determine the direction of chart movement tended to be established by the natural radius of the leading portion of the chart. In the proportions shown in FIGURE 7, the counterclockwise extension of guides 15, i.e., from 17, would constrain even a perfectly flat chart portion moving with its surface parallel to the fore-surface of platen 51, to bend around the rewind drum 47. The clockwise extension of guides 15 (and of guide 5 of FIGURES 1 to 6, inclusive), i.e., to 17, must be far enough that when the leading edge of the advancing portion of chart moves off the guides, said edge moves off the guide with a component of motion in the same direction as the portion of the chart just then entering the guides 15, since if the said leading edge hit the last said portion of the chart approximately perpendicularly, chart might jam up in the rewind mechanism and fail to wind up on rewind drum 47.

Hold-down guide 15A, guides 15 and spherical elements 14, though specifically different structurally from, respectively, roller 2, guide 5, and roller 3 are in effect functionally equivalent thereto, as is apparent from what has been described above as to the operation of the several forms of the invention. The guides and elements of FIGS. 7 and 8, however, are less costly since they use less material and need no bearings, and, moreover, have less surface against which the chart might stick under highly humid conditions.

It will be noted that cinching of an advancing end of strip chart on the rewind drum depends on the rewind drum pulling said end around it faster than the drive drum can drive chart toward the rewind drum. Hence, it is obvious that, if the spring loading of guide 15A (or roller 2) is low enough, the rewind drum may not be able to generate enough friction against the chart surface to drag a leading end of chart around itself fast enough to cinch the paper on the roll. If rewound chart is removed frequently, say every hour or so in a transport mechanism either lacking a hold-down guide 15A (or a roller 2) it may not matter that chart is not rewound tightly. However, since under these circumstances, to a great extent the chart is being propelled around the rewind drum by the drive drum, more or less, depending on the rate of chart movement, the perforations in the chart margin are loaded to such extent that the chart-engaging teeth on the drive drum 48 are likely to begin to skip over the perforations and/or the loosely-wind chart to begin to jam up in the space between guides 15 (or guide 5) and the rewind drum.

On the other hand, the rewind operation is relatively insensitive to heavy loading by guide 15A since the effect of heavy loading is to cause the first layer of chart to be pressed so tightly against the center-O-rings, that said first layer is pulled around the rewind drum at practically rewind drum speed, whereas, the next layer of chart slips readily relative to the said first layer. Hence, short of loading the guide 15A (or roller 2) so heavily that the rewind drum is prevented from ever moving so fast as to attempt to overrun drive drum 48, chart will be cinched tightly about the rewind drum for a wide range of loading of guide 15A (or of roller 2).

The rewind drum, of course, cannot possibly go faster than the drive drum unless something like a slip-clutch couples it to some motor means that would drive the rewind drum faster than the drive drum unless the said slip-clutch slipped. Such a clutch, for example, that described in the aforesaid copending application of Klumb and Heller corresponds to a servo-mechanism responsive to resistance to rewind drum rotation to slow the rewind drum down when the said resistance surpasses a given value, and to speed up said rewind drum at some value of said resistance less than the first mentioned value. Broadly speaking, it is conventional to provide chart transport mechanisms with slip-clutches of various types, or equivalent, having the aforementioned characteristics in order to compensate for the tendency of strip chart tension between drive drum and rewind drum to increase, for reasons more fully set out in said copending application. Since slip-clutches of types other than that disclosed in said copending application, or equivalent, may also be used in my inventive chart transport mechanism, it is not intended that the present invention be restricted to incorporation of any specific slip-clutch, or equivalent. In fact, it is obvious that, if tight cinching of the chart is not required, the rewind drum can be directly driven and allowed to slip against the chart therearound, whereby undesirable increase of tension in the chart between drive drum and rewind drum cannot occur.

In any event, insofar as slip-clutch control of rewind speed is concerned, drum 47, purely for the sake of illustration, may be supposed to be frictionally-coupled by a horizontal interior surface thereof to a clutch disk 100 which projects into the tubular interior 101 of drum 47.

Disk 100 may be rigidly coupled to a pinion or pulley 103, or other such element, by a shaft 102, shaft 102 being mounted both for rotation thereof by rotation of pinion or pulley 103, and for supporting drum 47. Drive drum 48 also has a pulley or pinion 104, or other such element operatively connected by any suitable means (not shown) to drum 48 for rotating said drum 48. For driving the said drums, suitable gearing, an endless belt, or the like (not shown) would be provided connecting the said pulleys or pinions 103 and 104 to motor 43, in an arrangement such that motor operation would drive the said gearing or pulley such as to rotate the said drums clockwise (from the view of FIGURE 7). Assuming the motor output to be transferred in like amounts to pulleys or pinions 103 and 104, the drum 47 will rotate much faster than drum 48 since pulley or pinion 103, as shown, is smaller than pulley or pinion 104. Therefore, considering drive and rewind relations, such as are illustrated in FIGURE 6, the rewind drum will obviously try to roll up chart faster than the drive drum can feed it across the platen and, as a result, disk 100 will slip, whereby chart will wind up tightly on drum 47.

Automatic chart rewind is particularly valuable where the chart is provided with numerical time-indicia printed on the chart in the course of manufacturing the chart. If a recorded section of chart is to be removed as soon is possible after the last instant of the period of recording corresponding to the recorded section to be removed, with automatic rewind according to my invention it is only necessary to wait until the time graduation corresponding to said instant passes under the spherical elements 14 (or roller) and out from thereunder enough to permit tearing off or severing the recorded portion of chart at said time graduation and then to leave the recorder on its own to go about the business of rewinding the remaining chart. Obviously, however many sections of recorded chart are removed, under these circumstances, there is preserved the original synchronization or time relation between chart and stylus established when the recorder was loaded with the chart roll from which sections of recorded chart were torn.

Without automatic rewind, however, if the original time relation between chart time-indicia and stylus is to be preserved, while removing sections of chart, it is necessary to wait until the proper time-graduation, i.e., that at which the chart is to be torn or cut, has gone across the platen and partly or entirely around the rewind drum, or has gone an equivalent distance from the point at which the stylus contacts the chart, before tearing off the desired section of recorded chart, in order to have enough free end of chart to attach manually to the rewind drum or to an equivalent recorded-chart storage means. The time of waiting in this case will obviously be much larger than where automatic rewind is provided, other things being equal.

If the longer waiting time is not observed in a recorder lacking automatic rewind, and the recorded section of chart is removed as soon as the last part of the record trace of interest is past the stylus, it is then necessary to pull chart off the supply roll of chart that feeds chart to the stylus until there is a long enough free end of chart to reach the rewind drum, or equivalent. When the chart time-indicia is printed in, say, repeating 24 hour periods, it will be necessary to pull out a 24 hour length of unused chart, or even more, if the chart is also indexed in weekly cycles of the seven days of the week, as well. It is furthermore inevitable that there will be a gap in the useful recorded stylus trace corresponding to the time involved in resynchronizing chart time-indicia and the stylus, and to the uncertainty of resynchronizing time-indicia and stylus each time following removal of a section of recorded chart.

With my novel automatic rewind mechanism, once a roll of unused chart is started, never during the recording thereon is the initial synchronization departed from, no matter how frequently sections of recorded chart are removed.

As is evident from the foregoing, chart wastage may be quite large in the use of recorders lacking automatic rewind, unless the proper waiting period is observed before a given section of recorded chart is removed.

Strip chart lacking indicia of time is also used frequently and obviates some of the wastage that may be encountered in chart furnished with "ready-made" numerical time-indicia, since it would not be necessary to advance a 24-hour, seven-day, or other time-cyle of unused chart in order to synchronize and to get under way again the rewinding mechanism of a recorder lacking automatic rewind. Nevertheless, in the use of such chart, failure to observe the proper waiting period will result in some wastage, and, there will remain all the other disadvantages involved in the use of recorders lacking automatic rewind.

It is clear from the foregoing that, because of my novel automatic rewind feature, a given roll of chart may have hundreds of sections torn off as these sections are recorded upon, yet the last of the sections will have its time coordinates and recorded-variable coordinates as well synchronized, other things being equal, as the time coordinates and recorded-variable coordinates of the very first piece of recorded chart torn off the said given roll, and not one recorded instant will be lost.

On the other hand, it would be impossible to get the same results using a similar roll of chart in a recorder lacking automatic rewind, since each recorded section of torn-off chart would have been gained either at an inordinate expense of waiting time, on the one hand, and/or on the other hand, of tremendous waste of chart, gaps in the record and uncertainty of synchronization varying from piece to piece of chart. Furthermore, no matter how much or how little care and time be used in tearing off sections of recorded chart so as to reduce wastage, uncertainty of synchronization, and gaps in the record in the absence of automatic rewind according to my invention, it is nevertheless necessary to manually reconnect the strip chart to the rewind drum, or equivalent, each time a piece of chart is removed from the recorder.

The foregoing constitutes a complete and clear description of my invention in principle and in detail. Those skilled in the art, upon perusal of the said description, will be aware of many variations of my teachings that fall within the bounds of the claims appended hereto.

Having complied with the first paragraph of 35 U.S.C. 112, I claim:

1. In a strip chart transport mechanism including a rotatable drive drum constructed and arranged to engage strip chart for moving same past said drive drum and a rotatable rewind drum constructed and arranged to rewind strip chart moved past said drive drum, and motor means constructed and arranged to rotate said drums, the improvement comprising means for preventing an advancing end of strip chart moving past said drive drum from disengaging from said drive drum, first guide means for guiding said advancing end of strip chart toward said rewind drum, second guide means positioned to receive said advancing end of strip chart for wrapping said advancing end around said rewind drum in accordance with the sense of rotation of said rewind drum, said second guide means including a surface everywhere spaced from said rewind drum to such extent as to permit the advance end of a strip chart to be conducted full circle around said rewind drum in a loose coil of larger circumference than said rewind drum, and means for creating drag between said advancing end of strip chart and said rewind drum, the last said means including a wringer element mounted for movement toward and away from said rewind drum, said wringer element forming part of said second guide means and being biased into contact with the circumferential surface of said rewind drum, whereby friction is generated between said wringer element and said circumferential surface; said circumferential surface being provided with friction generating means extending substantially around said rewind drum and of such frictional characteristics that, if chart surface be pressed between said wringer element and said circumferential surface, the coefficient of friction between chart surface and said circumferential surface of said drum is greater than the coefficient of friction between said wringer element and chart surface, and the former said coefficient of friction is also greater than that which would exist between adjacent surfaces of a pair of layers of chart pressed between said wringer element and said circumferential portion.

2. The invention of claim 1 wherein said strip chart transport mechanism includes a roll of strip chart wherein the outer end of said strip chart is wrapped around said drive drum to be engaged thereby and has a natural radius of curvature at said drive drum conforming to the curvature of said drive drum; said strip chart transport also including, as said guide means, a platen and a curved guide; said platen extending between said rewind drum and said drive drum, and also being oriented so that the leading edge of said advancing end of strip chart as it comes past said drive drum is wrapped by said natural radius of curvature into contact with said platen, said curved guide being curved around and spaced from said rewind drum, said rewind drum and said curved guide being located so that said advancing end advances between said curved guide and said rewind drum with the curvature of the strip chart in the same sense as the curvature of said rewind drum, and said rewind drum being rotated in the same sense as said drive drum.

3. The invention of claim 1 wherein said strip chart transport mechanism is of the type wherein said motor means is arranged to rotate said rewind drum at a rate greater than necessary to rewind strip chart on said rewind drum, and includes means arranged to reduce the rate of rotation of said drum in accordance with the resistance of said rewind drum to rotation thereof, whereby unless said advancing end is cinched tightly around said rewind drum, said rewind drum rotates faster than necessary to rewind strip chart being moved to said rewind drum by said drive drum.

4. In combination, a substantially cylindrical rewind drum, motive means for rotating said rewind drum on its cylindrical axis, chart transport means for moving a strip chart end normal to said axis and in such a direction as to cause said end to contact a circumferential surface portion of said rewind drum having a component of movement in said direction, wringer means mounted for movement into contact with a circumferential surface portion of said rewind drum, means biasing said wringer means into contact with the last said circumferential surface portion, the place of such contact of said wringer means being so located that upon rotation of said rewind drum, as aforesaid, circumferential surface portions contacted by said strip chart end subsequently are contacted by said wringer means, said wringer means also being shaped so as to guide said strip chart end between it and said rewind drum; guide means having a guide surface curving around and facing the rotating surface of said drum, said guide surface being spaced therefrom a sufficient distance such that a loose cylindrical coil of strip chart of substantially larger circumference than said drum can be formed around said drum and between said guide surface and the rotating surface of said drum; said guide surface extending far enough around said drum and oriented such as to direct said strip chart end toward following portions of strip chart in the vicinity of said wringer element; whereby as the said rewind drum rotates and said strip chart end advances toward said drum, there will first be direct contact of said wringer means with the surface of said rewind drum and subsequently said strip chart end will pass between said wringer means and said rewind drum; said rewind drum being so constructed and arranged that circumferential surface portions thereof contacted by said wringer means define a drag surface extending circumferentially about said rewind drum, said drag surface being such that frictional drag creatable between it and strip chart by said wringer means is greater than that thus creatable between strip chart and strip chart, and is greater than the drag thus creatable between strip chart and said wringer means, whereby if said strip chart end be advanced by said chart transport means toward said rewind drum, as aforesaid, eventually said strip chart end will feed between said wringer means and said rewind drum, and thence around said rewind drum in a loose coil into contact with following portions of strip chart so as to be deflected thereby toward said rewind drum, and then will advance between said following portions and said rewind drum, thereby passing once more between said wringer means and said rewind drum; said motive means being constructed and arranged to rotate said rewind drum faster than said strip chart can be advanced by said chart transport means; whereby when said strip chart end passes under said wringer means for the second time, said strip chart end will be dragged around said rewind drum faster than said following portions enter the space between said rewind drum and the said guide surface, whereby the loose coil, formed upon the first passage of said strip chart end around said rewind drum, will be drawn up tightly around said rewind drum, and it and subsequent portions of strip chart following said end will be wound tightly on said rewind drum.

5. Strip chart rewinding means for use in a chart transport mechanism of the type including a drive drum and a roll of strip chart, said drive drum being arranged to drive strip chart from said roll past a marking device, said rewinding means including a cylindrical rewind drum mounted for rotation on its cylindrical axis, a chart guide extending around said rewind drum and having a guide surface facing the cylindrical surface of said rewind drum, said guide and its said guide surface extending enough less than full circle around said rewind drum to permit an advancing end of strip chart to be passed between said guide surface at one extremity of said guide and said rewind drum with the surface of said strip chart substantially parallel to the axis of said rewind drum, and said guide surface being spaced far enough from the cylindrical surface of said rewind drum to permit a substantial number of turns to be wound around said rewind drum without the resultant chart roll completely filling the space between the said guide surface and the cylindrical surface of said rewind drum; said cylindrical surface including a friction generating element extending substantially continuously entirely around said rewind drum; wringer means, said wringer means including a wringer element mounted for deflection into contact with the said friction generating element; bias means biasing said wringer element into contact with said friction generating element; said wringer element being constructed and arranged to generate less friction between it and said strip chart than would be generated between said friction-generating element and said strip chart, were a single layer of said strip chart interposed between said wringer element and the said cylindrical surface of said rewind drum; and said wringer means being located at said extremity of said guide and having means for guiding strip chart under said wringer element and between said guide surface and said cylindrical surface of said rewind drum.

References Cited in the file of this patent

UNITED STATES PATENTS

| | | |
|---|---|---|
| 2,225,433 | Goldberg | Dec. 17, 1940 |
| 2,344,661 | Wait | Mar. 21, 1944 |
| 2,839,256 | Boyan et al. | June 17, 1958 |

FOREIGN PATENTS

| | | |
|---|---|---|
| 367,118 | Great Britain | Feb. 18, 1932 |